United States Patent [19]

Helinski

[11] Patent Number: 5,136,515
[45] Date of Patent: Aug. 4, 1992

[54] METHOD AND MEANS FOR CONSTRUCTING THREE-DIMENSIONAL ARTICLES BY PARTICLE DEPOSITION

[76] Inventor: Richard Helinski, 56 Gowing Rd., Hudson, N.H. 03051

[21] Appl. No.: 433,695

[22] Filed: Nov. 7, 1989

[51] Int. Cl.⁵ .................... G06F 15/46; B32B 31/00
[52] U.S. Cl. .................... 364/468; 264/122; 264/221; 264/308; 364/474.05
[58] Field of Search ........... 364/468, 473, 474.05; 425/145; 264/308, 255, 122, 221

[56] References Cited

U.S. PATENT DOCUMENTS

| | | | |
|---|---|---|---|
| 3,949,125 | 4/1976 | Roberts | 264/250 X |
| 4,247,508 | 1/1981 | Housholder | 264/219 |
| 4,525,134 | 6/1985 | McHenry et al. | 425/145 X |
| 4,571,319 | 2/1986 | Baluch et al. | 425/145 X |
| 4,665,492 | 5/1987 | Masters | 364/468 |
| 4,781,560 | 11/1988 | Herbert | 425/145 X |
| 4,801,477 | 1/1989 | Fudim | 264/22 X |
| 4,836,814 | 6/1989 | Bambara et al. | 425/145 X |
| 4,860,442 | 8/1989 | Ainsworth et al. | 264/61 X |

Primary Examiner—Joseph Ruggiero
Assistant Examiner—Allen M. Lo

[57] ABSTRACT

A three dimensional article is produced layer by layer by jetting droplets of at least two different hardenable materials, as appropriate, into the various layers, the first material forming the article itself, and the second material forming a support for the article as necessary. The second material is thereafter separated from the first material, e.g., by heat, to form the desired article.

20 Claims, 1 Drawing Sheet

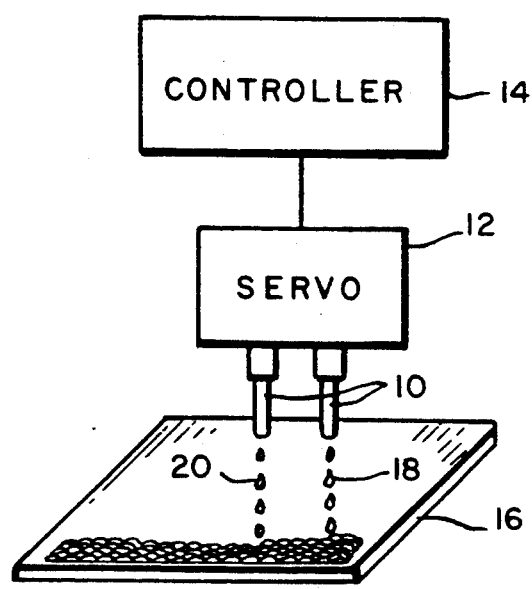

METHOD AND MEANS FOR CONSTRUCTING THREE-DIMENSIONAL ARTICLES BY PARTICLE DEPOSITION

I. BACKGROUND OF THE INVENTION

A. Field of the Invention

The present invention relates generally to the field of solid body construction, and more particularly to the fabrication of three-dimensional objects using particle deposition.

B. Description of the Related Art

In recent years, computer-aided design (CAD) technology has gained widespread acceptance in numerous engineering fields. Typical CAD systems permit the operator to design two- or three-dimensional constructs on a computer screen, then perform real-time rotation, translation and scaling operations with the on-screen image.

Many CAD systems also allow designation of a coordinate system, allowing the operator to relate each point of the two-or three-dimensional design to a corresponding point on the selected coordinate system. This capability facilitates interface to automated manufacturing systems, which construct or assist with construction of the finished design based on its spatial coordinate representation.

One method of automated manufacture is disclosed in U.S. Pat. No. 4,665,492, in which particles are sequentially deposited on a substrate according to the three-dimensional coordinate representation of the solid design. Several particle compositions and methods of deposition are described, including ejection of ceramic material in a heated environment, ejection of plastic material in an ionized atmosphere, and the use of slurry material in a sub-freezing environment. All of these techniques appear limited in their ability to produce constructs that contain oblique surfaces.

This difficulty stems from the need to maintain subjacent support of particles during the deposition process. Without such support, the angle between adjacent oblique layers is limited by the adhesion characteristics of the deposited material, as well as the size of the particles. Because particle mass varies with the cube of the radius while surface area depends on the square of the radius, very small particles may be needed for particular materials to be deposited at a desired angle. Thus, designs containing outwardly displaced features may be impossible to fabricate with presently available techniques, depending on the degree of displacement, fabrication material and particle size.

A second limitation of the method described in U.S. Pat. No. 4,655,492 relates to control of the ultimate spatial position of the deposited particle. The system described in this reference comprises two or more working heads to locate the point of deposition in space. This configuration must accommodate three degrees of freedom, resulting in the need for great control over movement of the working heads and precise monitoring of their positions.

II. DESCRIPTION OF THE INVENTION

A. Objects of the Invention

Accordingly, it is an object of the present invention to fabricate a physical object from a coordinate representation, without regard to the angular dimensions thereof.

It is a further object of the invention to permit such fabrication utilizing a variety of suitable materials.

It is yet another object of the invention to facilitate construction of a three-dimensional object using particle deposition in two dimensions.

B. Brief Summary of the Invention

The above objectives are accomplished using particles composed of two or more materials, each having different decomposition or adhesion characteristics. Each sequentially formed layer consists of particles of a first material ("fabrication particles") that define a layer of the finished model and, where necessary, particles of a second material ("support particles") that furnish support to the fabrication particles of the next layer to be deposited. When all layers have been deposited, the support particles are removed in a manner determined by the characteristics of their composition as compared to those of the fabrication particles.

C. Detailed Description of the Invention

The present invention, as well as further objects and advantages thereof, will be apparent from the following detailed description.

Practice of the invention requires two jetting heads, one supplied with material that will form the fabricating particles, and the other with material that will form the support particles. Numerous alternatives to this scheme are also possible. For example, a single jetting head incorporating two feeder lines may be used. In a different configuration, a first linear array of fabricating-particle jets and a second linear array of support-particle jets may be employed. The single-jet scheme offers compactness and economy, while the arrayed scheme permits deposition of a layer in a shorter time.

For purpose of illustration, an arrayed jet system is shown in the single FIGURE of drawings attached hereto.

The jetting head or heads 10 are connected by means of suitable electronic and mechanical linkages to one or more servo mechanisms 12, which are responsive to commands issued by a controller 14. The controller translates the coordinates representing a layer of the design (as compiled by the CAD system) into suitable servo commands to position the fabricating-particle jet above the corresponding position on the substrate 16 that will support the construction. The controller then causes a droplet 18 of particle material to be ejected. A complementary set of commands is issued by the controller to the support-particle jet, causing it to deposit droplets of support material 20 on positions of the substrate not occupied (or to be occupied) by fabrication particles. After deposition of this initial layer, subsequent layers are similarly formed on top of and in contact with one another.

This scheme permits layers of fabrication particles to be built up at virtually any angle of contact. The maximum angle will thus ultimately be determined essentially solely by the stress characteristics of the fabrication material itself, rather than parameters relating to and limited by the deposition technique.

Furthermore, the fact that particles are deposited in a sequence of two-dimensional layers permits greater flexibility with respect to choice or design of the controller, since only two degrees of freedom need be accommodated.

After all layers have been deposited, the structure consisting of the fused fabrication particles must be separated from the mass of support particles. The process by which this separation is accomplished depends on the choice of material for each type of particle.

In one embodiment of the present invention, both types of particles are made of wax, but the fabrication-particle wax has a higher melting point than that of the support-particle wax. Feeder lines deliver melted wax to the jetting head or heads. The temperature of the environment is controlled so that the wax droplets solidify on contact. After all layers have been deposited, the composite structure is immersed in a solution that has been heated to a temperature above the melting point of the support-particle wax, but below that of the fabrication particle wax. This causes the support mass to melt away, leaving the finished model.

In another embodiment, the fabrication-particle and support-particle materials are chosen so as to exhibit opposite vulnerabilities to the action of a solvent. For example, the support-particle material might be polar (such as an organometallic compound) and the fabrication-particle material nonpolar (such as wax). In this case, the final composite structure would be immersed in a polar solvent, causing the polar support material to dissolve away.

In a further embodiment, the fabrication-particle material is curable upon exposure to radiation of a predetermined wavelength, while the support-particle material is not. After each layer is deposited, it is exposed to this radiation prior to deposition of the next layer. So long as the cured material exhibits some interaction with identical material in the uncured state, the final composite structure will have differing hardness characteristics. Separation of the two components may be accomplished by suitable physical or chemical means. Materials suitable for practice of this embodiment of the invention are well-known in the art.

In yet another embodiment, the two materials are chosen for their immiscibility with respect to one another. So long as the finished three-dimensional design does not contain topologically opposed components, it may be separated manually from the surrounding support material due to the lack of adhesion therebetween.

The technique and means heretofore described may be usefully employed to produce a finished model, or a mold for such a model; the choice depends only on which material is selected for fabrication as opposed to support.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. An apparatus for producing a three-dimensional article from a coordinate representation thereof, said apparatus comprising:
   a. a controller adapted for receiving said coordinate representation and issuing movement commands in response thereto;
   b. movement means in communication with said controller;
   c. at least one jetting means coupled to said movement means and adapted for depositing liquid droplets of at least two solidifiable materials on a substrate in successive layers, said materials solidifying in direct contact with each other at the interface between them in the layer being formed when present in the same layer and during formation of said layer and being thereafter separable from each other to provide the desired article.

2. The apparatus of claim 1 wherein said at least two materials are separable from each other by physical means.

3. The apparatus of claim 1 wherein said at least two materials are separable from each other by chemical means.

4. The apparatus of claim 1 wherein one of said at least two materials is a first wax, and another of said at least two materials is a second wax, wherein said first wax has a melting point above that of said second wax.

5. The apparatus of claim 1 wherein said at least two materials exhibit opposite vulnerabilities to the action of a solvent.

6. The apparatus of claim 1 wherein one of said at least two materials is curable upon exposure to radiation of a predetermined wavelength.

7. The apparatus of claim 1 wherein said at least two materials are immiscible with respect to one another.

8. The apparatus of claim 1 wherein one of said at least two materials is a first phase-change material, and another of said at least two materials is a second phase-change material, wherein said first phase-change material has a melting point above that of said second phase-change material.

9. A method for producing a three-dimensional article from a coordinate representation thereof, comprising the steps of:
   a. providing a controller adapted for receiving said coordinate representation and issuing movement commands in response thereto;
   b. providing movement means in communication with said controller;
   c. providing at least one jetting means in communication with said movement means and adapted for depositing liquid droplets of at least two materials on a substrate, wherein said at least two materials solidify, after deposit, into states that are separable from one another;
   d. causing said jetting means to deposit a first set of liquid droplets at points on said substrate corresponding to points of one plane of said three-dimensional representation; and
   e. causing said jetting means to deposit a second set of liquid droplets at points on said substrate in said plane corresponding to points other than those of said three-dimensional representation and in direct contact with said first droplets at the interface therewith, each said droplet solidifying on deposit and fusing with immediately adjacent droplets in the layer being formed to form self-sustaining structural elements of said three-dimensional structure.

10. The method of claim 9 wherein said at least two materials are separable from each other by physical means.

11. The method of claim 9 wherein said at least two materials are separable from each other by chemical means.

12. The method of claim 9 wherein one of said at least two materials is a first wax, and another of said at least two materials is a second wax, wherein said first wax has a melting point above that of said second wax.

13. The method of claim 9 wherein said at least two materials exhibit opposite vulnerabilities to the action of a solvent.

14. The method of claim 9 wherein one of said at least two materials is curable upon exposure to radiation of a predetermined wavelength.

15. The method of claim 9 wherein said at least two materials are immiscible with respect to one another.

16. Apparatus for producing a three dimensional article layer by layer in response to commands from a controller, comprising:
   A. means for jetting onto a surface droplets of a first material hardenable to form a cross-sectional layer of said body, and
   B. means for jetting onto said surface droplets of a second material hardenable to form a support structure within said layer in regions where said first material is absent,
   said first and second materials being formed in direct contact with each other at their interface in the layer being formed when present in the same layer and hardening in said layer to support formation of subsequent layers of said article, said first and second materials being separable from each other thereafter.

17. Apparatus according to claim 16 in which said first and second materials comprise liquid droplets jetted at temperatures above their melting points and hardenable at lower temperatures to form the desired article.

18. Apparatus according to claim 17 in which said materials have different melting points to thereby allow separation of one material from another after formation of the article.

19. Apparatus according to claim 16 in which said jetting means positions at least some of said second material to provide support for said first material in an adjacent layer.

20. Apparatus according to claim 19 in which said jetting means comprises first and second jets independently operable to jet said first and second materials, respectively.

* * * * *